Aug. 17, 1926.  1,596,238
D. S. DE LAVAUD
VARIABLE POWER TRANSMISSION
Filed Jan. 20, 1923
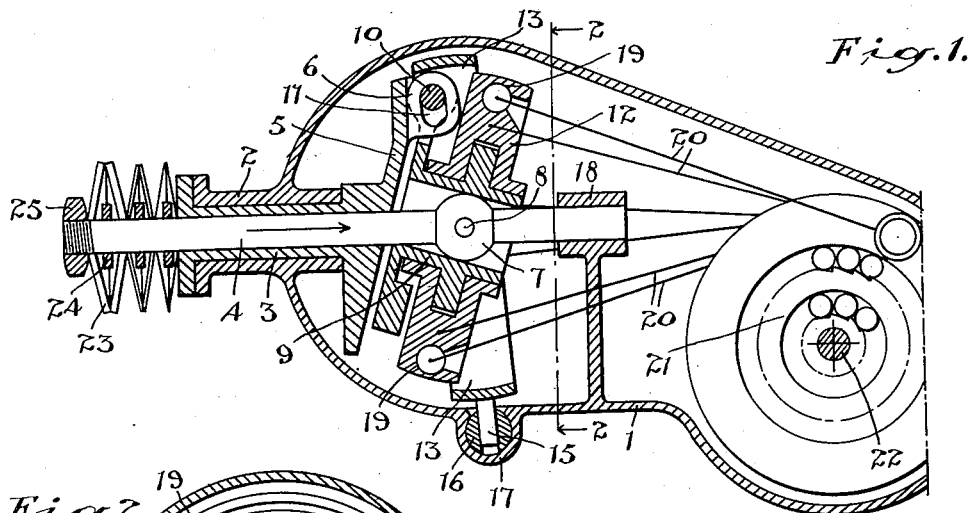
Fig.1.
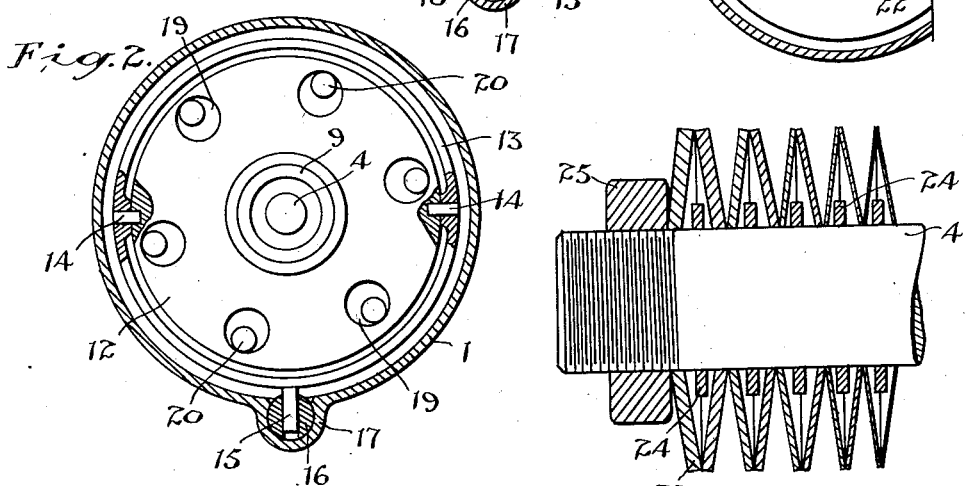
Fig.2.
Fig.3.
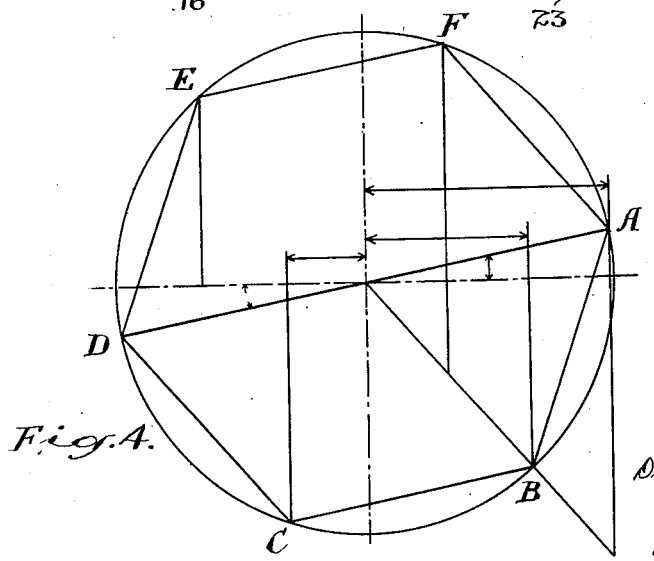
Fig.4.
Inventor.
Dimitri Sensaud de Lavaud
by H. J. S. Dennison
atty.

Patented Aug. 17, 1926.

1,596,238

UNITED STATES PATENT OFFICE.

DIMITRI SENSAUD DE LAVAUD, OF PARIS, FRANCE.

VARIABLE-POWER TRANSMISSION.

Application filed January 20, 1923. Serial No. 613,976.

The principal objects of this invention are, to improve the operation of a device such as illustrated and described in my United States Patent No. 1,536,819, particularly in respect to the connection between the driving shaft and the non-rotative oscillating member which is connected with the driven shaft by a plurality of reciprocating rods operating through ratchet mechanisms and in the balancing medium between the driving and driven members, in order to produce a more perfect transmission of the applied power.

The principal feature of the invention consists in the provision of a controlling medium for the oscillating member which is pivotally connected thereto and has pivotal connection with the casing.

A further important feature consists in the novel construction and arrangement of flexible members upon the driving shaft which will function in a variable relation in respect to the velocities and their corresponding resisting couples.

In the drawings, Figure 1 is a longitudinal vertical sectional view of the improved construction.

Figure 2 is a transverse sectional view of the casing through the line 2—2 of Figure 1 showing the operating parts in elevation and part sectional view.

Figure 3 is an enlarged longitudinal sectional view of the flexible members encircling the driving shaft.

Figure 4 is a diagram illustrating the spaced arrangement of the points of connection of the reciprocating transmission rods to the oscillating member.

In the construction herein shown the transmission casing 1 is provided with a bearing 2 at one end in which is rotatably mounted the sleeve 3.

The driving shaft 4 is slidably and non-rotatably mounted in the sleeve 3. The sleeve 3 is formed with an oblique flange 5 at the inner end and a radially slotted lug 6 is arranged on the inward side adjacent to its perimeter.

The shaft is formed with a spherical enlargement 7 having a trunnion pin 8 arranged transversely thereof and on this trunnion pin is pivotally mounted the concentric sheave 9 which is pivotally connected by a pin 10 in the flange 11 thereof through the slotted lug 6.

A ring 12 is mounted upon the sheave 9 and the sheave is adapted to rotate freely within said ring.

A ring 13 encircles the ring 12 and is connected thereto on its horizontal axis by the pivot pins 14.

A squared pin 15 extends from the bottom of the ring 13 into a spherical head 16 arranged in a spherical socket 17 in the underside of the casing.

The function of the ring 13 is to control the ring 12 in its various positions. The ring 13 is anchored from rotation by the pin 15 but may swing freely by reason of its connection to the casing through the spherical head 16 and the pin 15 but while free to move in a fore and aft direction its connection to the ring 12 by means of the transversely arranged pivot pins 14 (which always maintain alignment with the trunnion 8) holds the ring 12 from rotation. The driving shaft 4 is preferably supported by a bearing 18 at the inward or rear side of the sheave 9.

The ring 12 is provided with spherical sockets 19 disposed a uniform distance apart and from the axis of the ring 12 and in these are housed the bearing ends of the rods 20 which operate the ratchet gear mechanisms 21 which operate the driven shaft 22.

The spacing of the sockets 19 and the number of connecting rods 20 employed and their spacing is a matter of considerable importance in the proper functioning of the device. Experience has shown that six or a multiple of six rods is the most desirable and it is important that the projections of the said connecting rod members on the horizontal diameter of the ring 12 be equally spaced on both sides of the centre as illustrated in Figure 4 the points A B C D E F representing the points of connection of the rods, and the parallel lines projected therefrom representing the rods.

The driving shaft is actuated to move longitudinally through the peculiar functioning of the mechanism within the casing in relation to the torque, that is to say, when the torque of the driving shaft reaches its maximum the shaft will have moved longitudinally until the ring 12 is in direct transverse or 90 degrees relations with the axis of the shaft and there will be no rotative movement of the driven shaft. As the resistance to the torque decreases the angularity of the obliquity of the ring 12 increases in proportion to the resisting couple through the medium of the flexible members encircling the shaft. These members comprise a pair of heavy dished spring discs 23 and other pairs of similar discs of progressively lighter material which will yield to the longitudinal stress resultant from the torque but will take up the proper position of the ring in proportion to the load.

This arrangement of elastic members forms a progressive reaction following a law which is easy to determine, being the function of the variable relation of velocities and of the corresponding resisting couples, the mechanical arrangement being a series of what are known as Belleville rundles coupled two by two as illustrated in Figures 1 and 3.

Between the spring discs are arranged the annular washers 24 to limit the collapsing of the discs.

In the operation of this transmission the driving shaft 4 connected with a source of power rotates the sleeve 3 and the shaft being held in its forward position by the spring members pressing against the adjustable stop 25 hold the spherical portion of the shaft and its trunnion 8 in such a position that the ring 13 will asume the maximum oblique position.

The ring 12 is held from rotation by the outside ring 13 and as the sheave 9 and sleeve 3 rotate with the shaft an oscillating movement is imparted to the ring 12 which in turn imparts reciprocating motion to the rods 20 which operate the driven shaft 22.

As the load upon the driven shaft varies, the resistance to the oscillation of the ring 12 is varied, consequently the driving shaft moves longitudinally and this longitudinal movement is regulated by the arrangement of graduated spring discs.

Under light loads the lighter discs will be pressed in against their supporting washers and as the load increases the heavier discs will be consecutively compressed, thus as the load increases, the resistance to the longitudinal movement of the shaft increases, thereby increasing the resistance to the movement of the ring 12 to a zero position where there will be no oscillation.

The net result of this construction is a remarkable sensitiveness to variation in load resulting in the automatic application of the required power to move the load smoothly. This feature is greatly enhanced by the application of the ring member 13 and in the equal balancing arrangement of the rods 20 each side of the horizontal centre.

What I claim as my invention is:—

1. In a variable power transmission, the combination with the driving and driven shafts and an oscillating member rotatable with the driving shaft and operatively connected with the driven shaft, of a graduated balancing medium adapted to effect a change in the position of the centre of rotation of the oscillating member and applying a graduated resistance to the torque of the driven member effecting an automatic adjustment of the angularity of the axis of rotation of the oscillating member.

2. In a variable power transmission, a driving shaft having longitudinal movement, an oscillating member supported from the driving shaft, a driven shaft operatively connected with said oscillating member, and spring means arranged to exert a graduated resistance to the longitudinal movement of the driving shaft.

3. In a variable power transmission, a driving shaft having longitudinal movement, an oscillating member supported from the driving shaft, a driven shaft operatively connected with said oscillating member, a plurality of spring members of graduated resisting strength arranged to oppose the longitudinal movement of the driving shaft in a direction to lessen the oscillating orbit of the oscillating member.

4. In a variable power transmission, a driving shaft having longitudinal movement, an oscillating member supported from the driving shaft, a driven shaft operatively connected with said oscillating member, and a plurality of concave spring discs arranged in pairs each pair being of lighter material than the adjacent pair in a graduated sequence, said discs being mounted upon the driving shaft, and washers interposed between the concaved faces of each pair of discs.

5. In a variable power transmission, a longitudinally moveable driving shaft, a sheave mounted on transverse trunnions carried by the driving shaft and rotating with the shaft, a ring encircling said sheave, means for maintaining the transverse axis of said sheave in true relation to the shaft irrespective of the movement of the shaft, a driven shaft, a plurality of rods operatively connected with the driven shaft and connected with said oscillatable ring at points circumferentially equidistant and equally spaced both sides of the horizontal axis.

DIMITRI SENSAUD DE LAVAUD.